United States Patent [19]
Motzko et al.

[11] Patent Number: 6,028,411
[45] Date of Patent: Feb. 22, 2000

[54] CIRCUIT AND METHOD FOR MODULATING THE COMMUTATION FREQUENCY OF A DISC DRIVE MOTOR

[75] Inventors: Andrew Robert Motzko, Burnsville; Garry Edward Korbel, New Prague, both of Minn.

[73] Assignee: Seagate Technology, Inc., Shakopee, Minn.

[21] Appl. No.: 08/864,509

[22] Filed: May 28, 1997

Related U.S. Application Data

[60] Provisional application No. 60/036,580, Jan. 29, 1997.

[51] Int. Cl.[7] ........................................... G05B 1/02
[52] U.S. Cl. .............................. 318/606; 318/254
[58] Field of Search ................... 318/606, 607, 318/608, 603, 600, 254, 610, 560, 439; 363/41, 42; 388/812, 813, 820

[56] References Cited

U.S. PATENT DOCUMENTS

| | | | |
|---|---|---|---|
| 4,123,692 | 10/1978 | Gilmore et al. | 363/41 |
| 4,308,508 | 12/1981 | Sommer et al. | 332/18 |
| 4,947,093 | 8/1990 | Dunstan et al. | 318/560 |
| 5,530,326 | 6/1996 | Galvin et al. | 318/254 |
| 5,744,928 | 4/1998 | Tang et al. | 318/610 |

*Primary Examiner*—Jonathan Salata
*Attorney, Agent, or Firm*—Westman, Champlin & Kelly P.A.

[57] ABSTRACT

A motor control circuit controls a motor in a disc drive. The motor control circuit includes a voltage controlled oscillator (VCO) providing a commutation timing signal. A commutation circuit is operably coupled to the VCO and provides commutation signals to the motor based on the commutation timing signal. A phase locked feedback circuit is operably coupled to the commutation circuit and provides a feedback signal to the VCO based on a sensed commutation phase to control a frequency of the commutation timing signal. A modulator is operably coupled to the phase locked feedback circuit and modulates the feedback signal. A method is also provided in which the commutation timing signal is modulated so as to spread a frequency spectrum of the commutation signals.

18 Claims, 2 Drawing Sheets

CIRCUIT AND METHOD FOR MODULATING THE COMMUTATION FREQUENCY OF A DISC DRIVE MOTOR

REFERENCE TO RELATED APPLICATION

The present application is based on a provisional application Ser. No. 60/036,580 filed on Jan. 29, 1997.

FIELD OF THE INVENTION

The present invention relates generally to controlling the commutation frequency of a disc drive motor. More particularly, the present invention relates to modulating the commutation frequency.

BACKGROUND OF THE INVENTION

A brushless direct current (DC) motor is typically used to drive rotation of the spindle which carries a plurality of discs in a disc drive system. A brushless DC motor typically has a number of permanent magnets mounted on a rotor and a set of electromagnetic coils mounted on a stator. The rotor is made to rotate by energizing the coils in a specific sequence relative to the angular position of the rotor. The function of energizing the coils at specific points in the rotation is called "commutation" of the motor.

One prior method of motor commutation uses Hall sensors mounted on the stator for sensing the angular position of the rotor. Electronic circuits connected to the Hall sensors detect the passage of the rotor past the Hall sensors and switch the energy into a different electromagnetic coil (commutate) at that instant.

A second commutation method is based on back electromotive force (EMF) sensing. When the rotor rotates due to a coil being energized, an electromagnetic field is induced in the coils which are not currently energized. By sensing the resulting back EMF, the correct commutation state of the motor can be determined. Back EMF commutation has advantages in that it does not require the use of Hall sensors which tend to be large, and can be expensive.

The information derived from the back EMF is used to drive a voltage controlled oscillator (VCO) in a phase locked loop control circuit. The output of the VCO is used to precisely clock commutation control logic which correctly commutates the motor for maximum torque efficiency, and motor direction.

While this type of motor commutation control circuit provides an excellent means of precisely commutating the motor at the optimum time, it has a drawback in that it creates a very pure tone, jitter free, commutation signal. Also, this signal is used to feed the motor through highly efficient, fast switching, power field effect transistors. Thus, high rates of current change in the motor coils are induced, and can cause audible mechanical resonances at the commutation frequency, and at harmonics of the commutation frequency. Further, such a system can exhibit electromagnetic radiation at high enough levels that it can become a concern, especially in the high frequency harmonics of the exceptionally jitter free commutation signal provided. If the unwanted resonances and radiation reaches a sufficient amplitude, they can lead to undesirable audible noise, servo track following errors and read/write errors.

The present invention provides a solution to this and other problems, and offers other advantages over the prior art.

SUMMARY OF THE INVENTION

The present invention relates to a system which is directed to solving one or more of the above-mentioned problems.

In accordance with one embodiment of the invention, a motor control circuit is provided for controlling a motor in a disc drive. The motor control circuit includes a voltage controlled oscillator which provides a commutation timing signal. A commutation circuit provides commutation signals to the motor based on the commutation timing signal. A phased locked feedback circuit senses commutation phase and provides a feedback signal to the VCO based on commutation phase to control an oscillation frequency of the VCO. A modulator is coupled to the phase locked feedback circuit and modulates the feedback signal to spread a frequency spectrum of the commutation timing signal, and to thus spread a frequency spectrum of the commutation signals provided to the motor.

The present invention can also be implemented as a method for commutating a motor in a disc drive. The VCO and a phase locked feedback circuit are provided. A commutation timing signal is provided by the VCO. Commutation signals are provided to the motor based on the commutation timing signal. Commutation phase is sensed and a feedback signal is provided to the VCO based on the commutation phase to control an oscillation frequency of the VCO. The feedback signal is modulated to spread the frequency spectrum of the commutation timing signal, and thus of the commutation signals.

These and various other features as well as advantages which characterize the present invention will be apparent upon reading the following detailed description and review of the associated drawings.

DETAILED DESCRIPTION OF THE PREFERRED EMBODIMENTS

Figure 1:
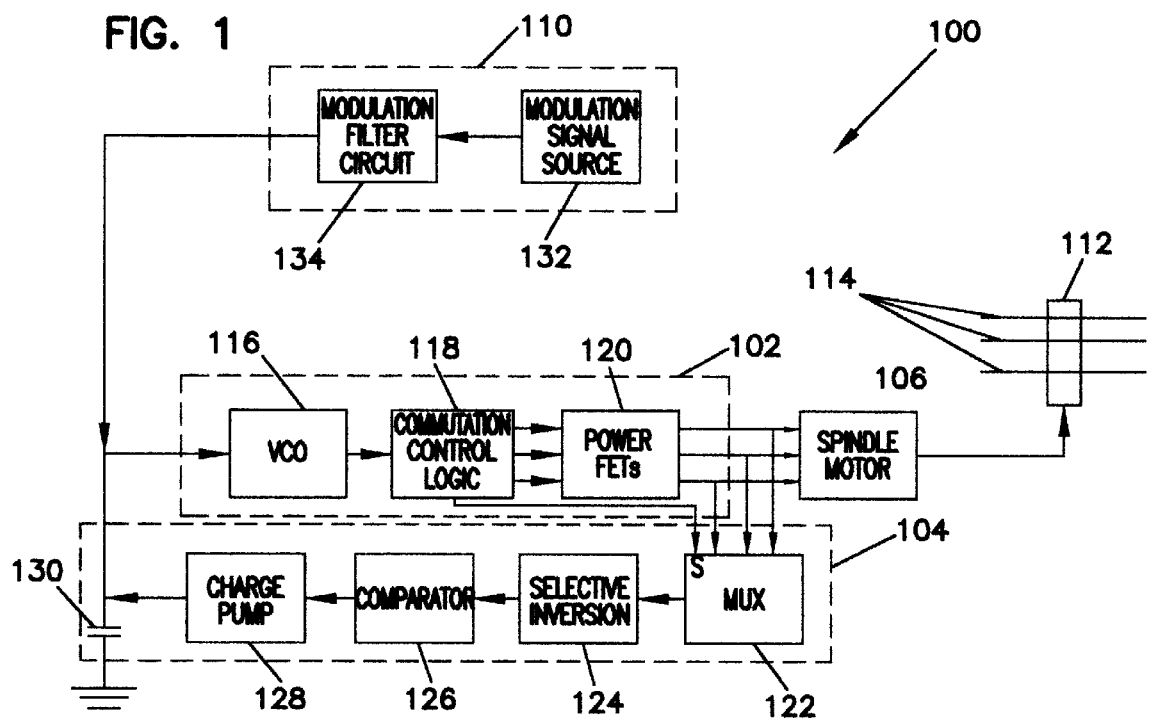
FIG. 1 is a block diagram of a commutation control circuit in accordance with one preferred embodiment of the present invention.

FIG. 1 is a block diagram of a motor control circuit 100 in accordance with one preferred embodiment of the present invention. A system, such as system 100, includes commutation signal generator circuit 102, phase locked feedback circuit 104, spindle motor 106, and modulation circuit 110. Motor 106 is also diagrammatically shown coupled to spindle 112 which is illustrated supporting a plurality of data storage discs 114, for rotation with spindle 112.

Commutation signal generator circuit 102, in one preferred embodiment, includes voltage controlled oscillator (VCO) 116, commutation control logic 118 and power field effect transistors (power FETs) 120. Phase locked feedback circuit 104 includes multiplexer (MUX) 122, selective inversion circuit 124, comparator 126, charge pump 128, and phase locked loop (PLL) filter capacitor 130.

Modulation circuit 110, in one preferred embodiment, includes modulation signal source 132 and modulation filter circuit 134. The output of modulation circuit 110 (i.e., the output of modulation filter circuit 134) is coupled to an input of VCO 116. Phase locked feedback circuit 104 provides a feedback signal to PLL filter capacitor 130, which is also coupled to the input of VCO 116.

The operation of system 100 will be described with reference to the waveforms illustrated in FIG. 2. Phase locked feedback circuit 104 senses the back EMF associated with spindle motor 106. An analog signal indicative of the back EMF sensed is provided by phase locked feedback circuit 104 to VCO 116. Based upon the back EMF sensed, VCO 116 provides a square wave output signal at a frequency determined by the analog input signal to VCO 116. The square wave output signal is indicated by waveform 136 in FIG. 2.

Commutation control logic 118 receives signal 136 from VCO 116 and provides three commutation signals 138, 140 and 142 (shown in FIG. 2) to respective power FETs 120. The output of the power FETs 120 are provided to spindle motor 106 and are used to drive spindle motor 106. Each of the power FETs 120 is driven in all of the states, except for the transition states from a low to a high signal, and from a high to a low signal. Thus, for each phase, each power FET 120 is driven to a high voltage for two commutation periods (illustrated by waveform 136) is in transition for one commutation period, is driven low for two commutation periods, and is back in transition for the final commutation period. This cycle repeats every six commutation periods (or commutation counts) with each motor phase being delayed by 120° electrical from the others.

Multiplexer 122 receives, as its inputs, the commutation signals 138, 140 and 142 provided at the output of the power FETs 120. The multiplexer 122 is configured to select, and provide at its output, based on an output of commutation control logic 118, each of the commutation signals, in turn, during that particular commutation signal's undriven phase. The output of multiplexer 122 is thus illustrated by waveform 144 in FIG. 2.

Figure 2:
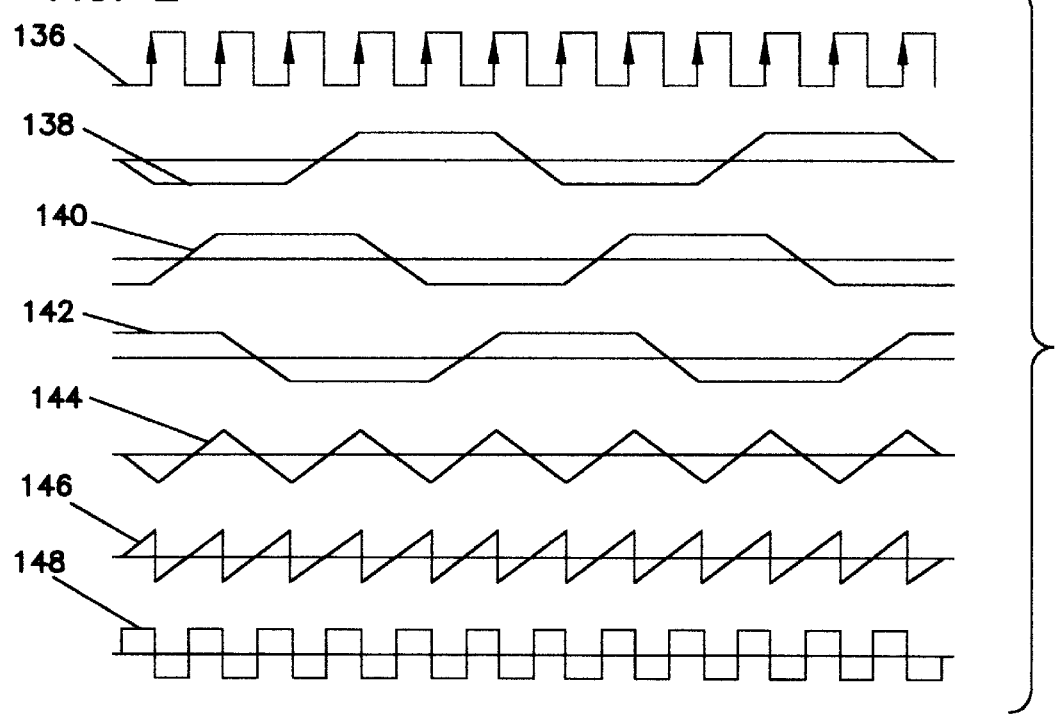
FIG. 2 is a timing diagram illustrating operation of the circuit shown in FIG. 1, without modulation.

For the idealized transitions shown in FIG. 2, where the commutation signals are precisely in phase with the motor, multiplexer signal 144 is a perfectly triangular waveform. Signal 144 is provided to selective invertor 124 where it is selectively inverted. This results in a sawtooth waveform 146. The particular waveform 146 shown in FIG. 2 corresponds to the commutation signals and the motor being precisely in phase. Thus, waveform 146 is greater than the center voltage exactly 50% of the time, and is less than the center voltage exactly 50% of the time.

During commutation/motor phase errors, waveform 144 is distorted making it non-symmetrical about the center voltage. The amount of non-symmetry corresponds to the phase error, and the average voltage value relative to the center voltage becomes non-zero. This creates an error in signal 146 such that signal 146 is either greater than the center voltage, or less than the center voltage (depending on the direction of the phase error) in excess of 50% of the time.

This error signal 144 is fed through comparator 126 where it is compared with the center voltage and is used to drive charge pump 128 which is connected to PLL filter capacitor 130. When signal 146 has a 50% duty cycle (i.e., it is above the center voltage 50% of the time and below the center voltage 50% of the time) PLL filter capacitor 130 is charged and discharged by the same amount (as indicated by waveform 148 in FIG. 2) creating no net change in the voltage fed into VCO 116. However, any phase errors cause an unequal amount of charge or discharge on PLL filter capacitor 130, leading to a net change in voltage fed into VCO 116. This causes the commutation frequency to adapt to, and track, the physical position of spindle motor 106. This type of circuit, by itself, results in an output frequency of signal 136, from VCO 116, which is very stable, has very low jitter, and which exhibits power that is distributed into tight bands in the frequency domain.

In accordance with the present invention, modulation circuit 110 is provided and has a modulation output signal connected to the input of VCO 116. Modulation circuit 110, in one preferred embodiment, includes modulation signal source 132 and modulation filter circuit 134. The output of modulation filter circuit 134 is connected directly to PLL filter capacitor 130. This connection effectively creates the ability to add to, or subtract from, the charge current flowing to PLL filter capacitor 130. The net change in charge current leads to a change in the voltage at the input of VCO 116, and therefore results in a change in the VCO output frequency represented by waveform 136. This, in turn, causes a change in the commutation frequency.

Figure 3:
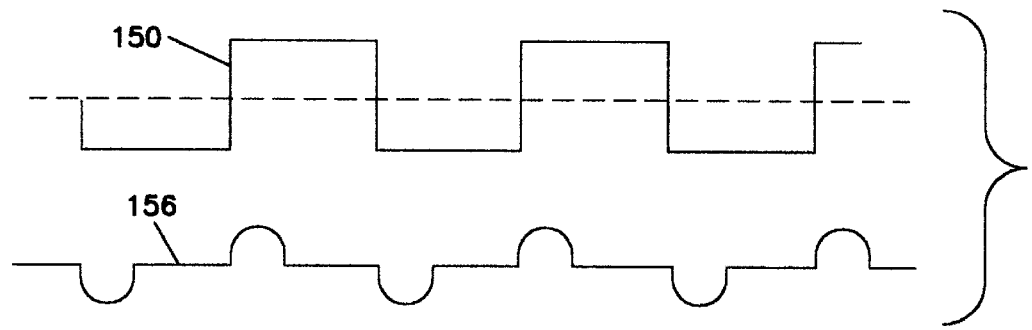
FIG. 3 is a timing diagram illustrating one preferred embodiment of modulation waveforms.

In one embodiment of the present invention, modulation signal source 132 is configured to provide an output which is simply a square wave illustrated by waveform 150 in FIG. 3. Square wave 150 can be generated with a period that is synchronous with motor speed, or asynchronous. However, any suitable modulation signal source 132 can be used, so long as it generates a signal which spreads the commutation signal frequency spectrum. For instance, the modulation signal source 132 need not even provide a square wave, but could provide any suitable signal containing desired modulation frequency components which are chosen based on the particular existing control loop, the resonant frequencies of the materials used in the particular drive, the modulation filter circuit 134 which is designed, or the particular frequency of electromagnetic radiation which is desired to be reduced.

Figure 4:
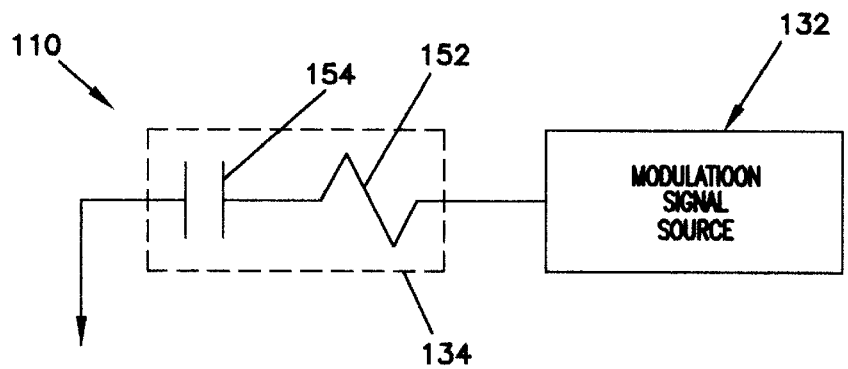
FIG. 4 is a block diagram, shown in partial schematic form, of one preferred embodiment of a modulation circuit shown in FIG. 1.

Modulation filter circuit 134 is shown in FIG. 4 and includes, in one preferred embodiment, series connected resistor 152 and capacitor 154 which serve to differentiate square wave 150. This differentiation yields an impulse function represented by waveform 156 in FIG. 3 at the positive and negative transitions of square wave 150. The impulse function essentially becomes representative of the current added to, and subtracted from, PLL filter capacitor 130. The particular component values in modulation filter circuit 134 determine the amount of charge injected at each impulse.

Figure 5:
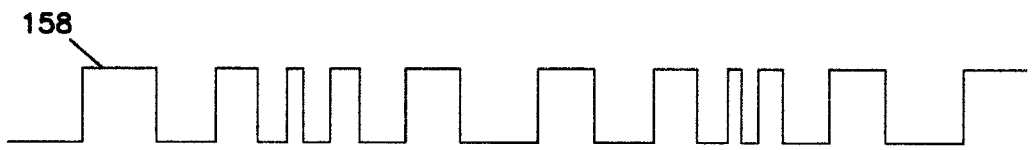
FIG. 5 illustrates timing diagrams of the commutation timing signal provided by the voltage controlled oscillator, under modulation.

FIG. 5 illustrates waveform 158 (which is exaggerated for the sake of clarity) which represents the output of VCO 116 when modulation circuit 110 is added to the system. As waveform 158 illustrates, the modulation signal tends to smear the output pulses from VCO 116 between two frequencies. The average frequency of the output of VCO 116 over time does not change, because spindle motor 106 is rotating at substantially the same speed. However, smearing the output frequency of VCO 116 (and consequently the commutation frequency) between two frequencies results in the power distribution of the commutation signals in the frequency domain having more, shorter and broader peaks around the output frequency, and around the harmonics of the output frequency than would otherwise be the case without modulation.

Figure 6:
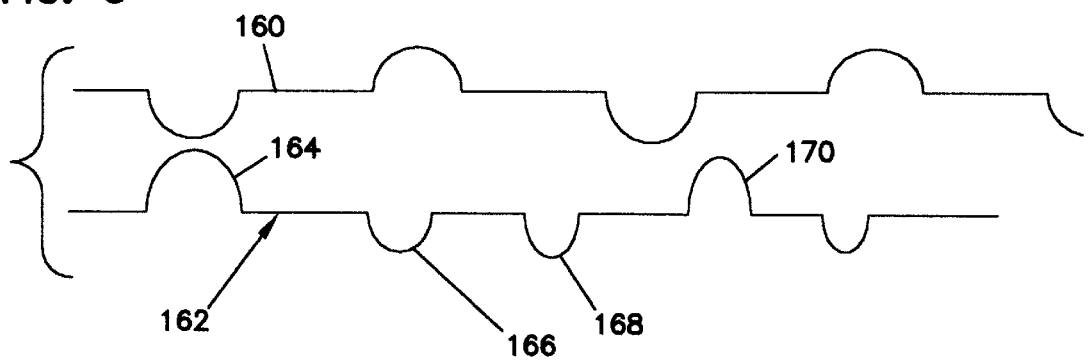
FIG. 6 illustrates other preferred embodiments of modulation waveforms in accordance with the present invention.

While waveform 156 in FIG. 3 represents one preferred embodiment of the modulation signal provided to PLL filter capacitor 130, and while this signal represents an embodiment in which the VCO output frequency is modulated between two frequencies, it should be recognized that other modulation signals can be used as well. FIG. 6 illustrates a number of other examples of modulation signals which can be used. Waveform 160 illustrates a modulation signal which can be implemented simply by changing the components in modulation filter circuit 134. The impulses provided by modulation waveform 160 are broader and have a greater amplitude than those illustrated in waveform 156. This causes the output frequency of VCO 116 to be modulated between two frequencies which are further apart than those illustrated by modulation waveform 156.

Waveform 162 illustrates another preferred embodiment in which the output frequency of VCO 116 is modulated among more than two frequencies. For instance, when pulse 164 of waveform 162 is applied to PLL filter capacitor 130, the output frequency of VCO 116 is modulated to a first, higher frequency. Then, when pulse 166 is applied to PLL filter capacitor 130, the output frequency of VCO 116 is modulated to a second frequency, lower than the first frequency. When pulse 168 is applied to PLL filter capacitor 130, the output frequency of VCO 116 is modulated to a third frequency, even lower than the second frequency. Then, when pulse 170 is applied to PLL filter capacitor 130, the output frequency of VCO 116 is modulated back to a higher frequency, which is high then the second frequency, but lower than the first frequency. This type of modulation can continue in any predetermined pattern, or in a pseudo-random pattern.

It should also be noted that, while modulation circuit 110 has been described with respect to one preferred embodiment, the present invention contemplates other designs as well. For example, any suitable active or passive filter can be implemented as modulation filter circuit 134. Further, the filter can be a digital or an analog filter, and can be chosen to improve the effectiveness of the desired frequency modulation for any given system. For example, the filter can be designed to specifically avoid or filter all unwanted frequencies (or resonances) from the modulation signal, so that they are never introduced into the commutation signal.

Further, modulation signal source 132 can be any suitable source. The frequency of the modulation signal provided by source 132, and the quantity of charge injected at each edge by the modulation filter can be optimized to produce the desired results and to work in harmony with the initial control loop circuitry. While modulation signal source 132 has been described, in one embodiment, as generating a square wave, the present invention also contemplates using software programmable sources which operate under either simple, or elaborate, software algorithms.

While the present invention can also be implemented using a random modulation signal, which injects random amounts of charge so that the modulation frequency is modulated between any random number of frequencies, this may not be preferred for some systems. For example, if acoustic vibrations are to be eliminated from the system or reduced, a random modulation frequency is not preferred. Each hardware item in the system will tend to vibrate (or resonate) at a given frequency. If those frequencies are known, and eliminated from the modulation frequencies, then the acoustic tones can be eliminated (or substantially reduced) in the system. However, a random modulation frequency will inevitably modulate the commutation frequency to the resonant frequencies of the hardware system. Thus, a random modulation frequency may not eliminate or reduce the acoustic tones which are desired to be eliminated.

Also, while the present invention has been described with respect to eliminating or reducing audible or acoustic emissions from the system, the present invention can be utilized to eliminate emissions throughout the entire electromagnetic spectrum. For example, disc drive arrays are notoriously known for emitting fairly high levels of electromagnetic radiation. In an array in which the preset invention is utilized in the drives in the array, the high frequency harmonics emitted by the array can be significantly reduced.

The present invention includes a motor control circuit 100 for controlling a motor 106 in a disc drive. The motor control circuit 100 includes a voltage controlled oscillator (VCO) 116 providing a commutation timing signal. A commutation circuit 118 is coupled to the VCO and provides commutation signals to the motor 106 based on the commutation timing signal. A phase locked feedback circuit 104 is coupled to the commutation circuit 118, 120 to sense commutation phase and provide a feedback signal to the VCO 116 based on the sensed commutation phase to control a frequency of the commutation timing signal. A modulator 110 is coupled to the phase locked feedback circuit 104 and provides a modulation signal modulating the feedback signal.

The modulator 110 includes a modulation signal source 132 and a modulation filter 134 coupled to the modulation signal source 132 to filter the signal provided by the modulation signal source 132. The modulation signal source 132 and the modulation filter 134 are configured to modulate the frequency of the modulation timing signal among the plurality of frequencies.

In one embodiment, the frequencies comprise predetermined frequencies, while in another embodiment, the frequencies comprise pseudorandom frequencies. In a further preferred embodiment, the frequencies include more than two predetermined frequencies.

The present invention also includes a method of commutating a motor 106 in a disc drive. The method includes providing a commutation timing signal, commutating the motor with commutation signals provided at a commutation frequency based on the commutation timing signal, sensing a phase relationship between rotation of the motor 106 and the commutation of the motor 106, adjusting the commutation frequency based on the phase relationship sensed, and modulating the commutation timing signal so as to spread a frequency spectrum of the commutation signals.

In one embodiment, the commutation timing signal is modulated between at least two of a plurality of predetermined frequencies to reduce acoustic emissions from the disc drive. In another preferred embodiment, the commutation timing signal is modulated between at least two of a plurality of predetermined frequencies so as to reduce selected electromagnetic emissions from the disc drive. In yet another preferred embodiment, the commutation timing signal is modulated among three or more frequencies.

In a preferred embodiment, the present invention is implemented in a disc drive with a rotatable spindle 112 and at least one disc 114 supported by the spindle 112 for rotation with the spindle. Motor 106 is coupled to the spindle to drive rotation of the spindle and a motor control circuit, 102, 104, and 110 is provided for controlling rotation of motor 106. The motor control circuit includes a modulator 110 which modulates a frequency at which motor 106 is commutated to reduce an amplitude of power contained in the commutation signals at the commutation frequency, and harmonics of the commutation frequency. In still a further preferred embodiment, the modulator includes a software configurable modulator.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular system in which the present modulation circuit is implemented, while maintaining substantially the same functionality without departing from the scope and spirit of the present invention.

What is claimed is:

1. A motor control circuit for controlling a motor in a disc drive, the motor control circuit comprising:

a voltage controlled oscillator (VCO) providing a commutation timing signal;

a commutation circuit operably coupled to the VCO which provides commutation signals to the motor based on the commutation timing signal;

a phase locked feedback circuit operably coupled to the commutation circuit, which provides a feedback signal to the VCO based on a sensed commutation phase to control a frequency of the commutation timing signal; and a modulator, operably coupled to the phase locked feedback circuit, which modulates the feedback signal.

2. The motor control circuit of claim 1 wherein the modulator comprises:

a modulation signal generator providing a first signal; and a modulation filter operably coupled to the modulation signal generator to filter the first signal to provide a modulation signal which modulates the feedback signal to spread a frequency spectrum of the commutation timing signal.

3. The motor control circuit of claim 2 wherein the modulation signal generator and the modulation filter are configured to modulate the frequency of the modulation timing signal among a plurality of frequencies.

4. The motor control circuit of claim 3 wherein the plurality of frequencies comprise predetermined frequencies.

5. The motor control circuit of claim 3 wherein the plurality of frequencies comprise pseudorandom frequencies.

6. The motor control circuit of claim 3 wherein the plurality of frequencies comprise only a first predetermined frequency and a second predetermined frequency.

7. A method of commutating a motor in a disc drive, the method comprising:

providing a commutation timing signal;

commutating the motor with commutation signals provided at a commutation frequency based on the commutation timing signal;

sensing a phase relationship between rotation of the motor and commutation of the motor;

adjusting the commutation frequency based on the phase relationship sensed; and modulating the commutation timing signal so as to spread a frequency spectrum of the commutation signals.

8. The method of claim 7 wherein modulating the commutation timing signal comprises:

modulating the commutation timing signal between at least two of a plurality of predetermined frequencies so as to reduce acoustic emissions from the disc drive.

9. The method of claim 7 wherein modulating the commutation timing signal comprises:

modulating the commutation timing signal between at least two of a plurality of predetermined frequencies so as to reduce selected electromagnetic emissions from the disc drive.

10. The method of claim 7 wherein modulating the commutation timing signal comprises:

modulating the commutation timing signal among three or more frequencies.

11. The method of claim 7 wherein the modulation timing signal is provided by a voltage controlled oscillator (VCO) at a frequency determined by the sensed phase relationship, and wherein adjusting the commutation frequency comprises:

providing an input signal to the VCO based on the sensed phase relationship.

12. The method of claim 11 wherein modulating the commutation timing signal comprises:

generating a modulation signal; and modulating the input signal to the VCO with the modulation signal.

13. A disc drive, comprising:

a rotatable spindle;

at least one disc supported by the spindle for rotation with the spindle;

a motor operatively coupled to the spindle to drive rotation of the spindle;

a motor control circuit, operatively coupled to the motor, to control rotation of the motor, the motor control circuit, including:

a voltage controlled oscillator (VCO) providing a commutation timing signal;

a commutation circuit operatively coupled to the VCO which provides commutation signals at a commutation frequency to the motor based on the commutation timing signal;

a phase locked feedback circuit operatively coupled to the commutation circuit, which provides a feedback signal to the VCO based on a sensed commutation phase to control a frequency of the commutation timing signal; and a modulator, operatively coupled to the phase locked feedback circuit, which modulates the feedback signal, the modulator being configured to provide a modulation signal so as to reduce an amplitude of power contained in the commutation signals at the commutation frequency and harmonics of the commutation frequency.

14. The disc drive of claim 13 wherein the modulator comprises:

a modulation signal generator providing a first signal; and a modulation filter operatively coupled to the modulation signal generator to filter the first signal to provide the modulation signal.

15. The disc drive of claim 14 wherein the modulation signal source and the modulation filter are configured to modulate the frequency of the modulation timing signal between at least two frequencies.

16. The disc drive of claim 15 wherein the at least two frequencies comprise predetermined frequencies.

17. The disc drive of claim 15 wherein the at least two frequencies comprise pseudorandom frequencies.

18. The disc drive of claim 13 wherein the modulator comprises a software configurable modulator.

* * * * *

UNITED STATES PATENT AND TRADEMARK OFFICE
CERTIFICATE OF CORRECTION

PATENT NO. : 6,028,411
DATED : February 22, 2000
INVENTOR(S) : Andrew R. Motzko et al.

It is certified that error appears in the above-identified patent and that said Letters Patent is hereby corrected as shown below:

On the title page:

Assignee:

[73] delete "Shakopee, Minn." insert --Scotts Valley, CA--.

Signed and Sealed this

Twenty-fourth Day of April, 2001

Attest:

NICHOLAS P. GODICI

Attesting Officer

Acting Director of the United States Patent and Trademark Office